US00RE39463E

(19) United States
(12) Reissued Patent
Ohsawa et al.

(10) Patent Number: US RE39,463 E
(45) Date of Reissued Patent: Jan. 9, 2007

(54) MULTI-LAYER INFORMATION RECORDING MEDIUM AND INFORMATION RECORDING AND REPRODUCING APPARATUS

(75) Inventors: Seiichi Ohsawa, Tsurugashima (JP); Takanori Maeda, Tsurugashima (JP)

(73) Assignee: Pioneer Corporation, Tokyo (JP)

(21) Appl. No.: 11/200,543

(22) Filed: Aug. 10, 2005

Related U.S. Patent Documents

Reissue of:
(64) Patent No.: 6,773,781
Issued: Aug. 10, 2004
Appl. No.: 10/147,979
Filed: May 20, 2002

U.S. Applications:

(63) Continuation of application No. 11/094,756, filed on Mar. 31, 2005.

(30) Foreign Application Priority Data

May 25, 2001 (JP) ..... 2001-156477

(51) Int. Cl.
*B32B 3/02* (2006.01)

(52) U.S. Cl. ..... 428/64.1; 428/64.4; 430/270.11
(58) Field of Classification Search ..... 428/64.4; 430/270.11
See application file for complete search history.

(56) References Cited

U.S. PATENT DOCUMENTS 5,097,464 A 3/1992 Nishiuchi et al.
5,202,875 A 4/1993 Rosen et al.

(Continued)

FOREIGN PATENT DOCUMENTS

EP 0 694 915 A1 1/1996
JP 03-054740 A 3/1991
JP 05-151591 A 6/1993
JP 09-054981 A 2/1997
JP 09-138970 A 5/1997

OTHER PUBLICATIONS

Copy of Office Action issued by Japanese Patent Office on Jun. 6, 2005 for Japanese Patent Application No. 2001–156477.

(Continued)

*Primary Examiner*—Elizabeth Mulvaney
(74) *Attorney, Agent, or Firm*—Finnegan, Henderson, Farabow, Garrett & Dunner, L.L.P.

(57) ABSTRACT

A multi-layer-information-recording medium is applied to an information recording and reproducing apparatus capable of recording or reproducing information on and from either of a single-layer-information-recording medium having a single recording layer on one side, and a multi-layer-information-recording layer having a plurality of recording layers layered on a spacer layer on one side as a change in reflectivity by irradiating a light beam. The multi-layer-information-recording medium is compatible in terms of at least reproducing and recording with a single-layer-information-recording medium having a cover layer having a predetermined refractive index "n" and a thickness "t" disposed on a recording layer on a light incident side surface. The multi-layer-information-recording medium includes a deepest recording layer deepest from the light incident side surface. The deepest recording layer is formed in an optical distance d1 from the light incident side surface satisfying an equation d1–nt. The multi-layer-information-recording medium also includes at least one shallow recording layer formed at an optical distance d2 satisfying an inequality d2<nt from the light incident side surface.

33 Claims, 5 Drawing Sheets

U.S. PATENT DOCUMENTS

| | | | | | |
|---|---|---|---|---|---|
| 5,303,225 | A | * | 4/1994 | Satoh et al. | |
| 5,608,715 | A | * | 3/1997 | Yokogawa et al. | 369/275.1 |
| 5,777,969 | A | | 7/1998 | Tomiyama et al. | |
| 5,838,646 | A | * | 11/1998 | Watanabe et al. | |
| 6,159,572 | A | | 12/2000 | Kobayashi et al. | |
| 6,175,548 | B1 | | 1/2001 | Kashiwagi | |
| 6,667,947 | B1 | * | 12/2003 | Maeda et al. | 369/275.1 |
| 2002/0021656 | A1 | * | 2/2002 | Tsukagoshi | |
| 2002/0060978 | A1 | * | 5/2002 | Hirotsune | |
| 2002/0080705 | A1 | * | 6/2002 | Van Woudenberg | |
| 2002/0132082 | A1 | * | 9/2002 | Hendriks | |

OTHER PUBLICATIONS

Copy of European Search Report dated Jan. 3, 2005 for European Patent Application No. 05 00 1940.*

Copy of Office Action issued by Japanese Patent Office on Jul. 27, 2005 for Japanese Patent Application No. 2001–156477.

* cited by examiner

MULTI-LAYER INFORMATION RECORDING MEDIUM AND INFORMATION RECORDING AND REPRODUCING APPARATUS

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a continuation reissue application of U.S. Reissue patent application Ser. No. 11/094,756, filed Mar. 31, 2005, which is a reissue application of U.S. Pat. No. 6,773,781 B2, issued Aug. 10, 2004, from U.S. patent application Ser. No. 10/147,979, filed on May 20, 2002, the entirety of which is incorporated herein by reference. This application claims the benefits of priority under 35 U.S.C. § 119, 120 to Japanese Patent Application No. 2001-156477, which was filed in the Japanese Patent Office on May 25, 2001, the entirety of which is incorporated herein by reference. Other related reissue applications claiming priority to this reissue application include U.S. Reissue patent application Ser. No. 11/200,544, filed Aug. 10, 2005, now pending, and U.S. Reissue patent application Ser. No. 11/200,545, filed Aug. 10, 2005, now pending.*

BACKGROUND OF THE INVENTION

1. Field of the Invention

The present invention generally relates to an information recording medium such as an optical disc, an optical card and the like, and more particularly to a multi-layer-information-recording medium which has a plurality of recording layers layered on spacer layers.

2. Description of the Related Art

In recent years, optical discs are widely used as means for recording and reproducing data such as video data, audio data, computer data and the like. A high density recording disc called DVD (Digital Versatile Disc) has been used in practice. As one type of DVD, there is a multi-layer disc in a laminate structure which has a plurality of recording layers that can be read from one side of the disc. A two-layer disc having two recording layers on one side has been used in practice as a disc dedicated to reproduction.

As illustrated in FIG. 1, the two-layer DVD dedicated to reproduction comprises a shallow recording layer, which is the first layer viewed from the side on which data is read, i.e., closer to a light incident side surface, and a deep or second recording layer. With the two-layer disc, any signal recorded in the shallow recording layer and the deep recording layer can be read from one side of the disc only by moving the focus of a reproducing light beam. The shallow recording layer is made of a translucent film such that a light beam can transmit the shallow recording layer and read a signal from the deep recording layer, and the film thickness and material are chosen conveniently for the shallow recording layer. A reflective film is used for the deep recording layer. An optically transparent spacer layer having a high transmittance at the wavelength of light is disposed between the shallow recording layer and the deep recording layer in order to separate these layers by a constant distance.

The DVD standard defines that a transparent cover layer on a recording layer of a single-layer disc, having only one recording layer, 600 μm thick, as illustrated in FIG. 2. On the other hand, a two-layer disc is formed to have a first recording layer and a second recording layer positioned at depths of 570 μm and 630 μm from the surface on which a light beam is incident, i.e., above and below the depth of 600 μm at which the recording layer of a single-layer DVD is disposed. The positioning of the two layers above and below the single recording layer in the thickness direction is employed in the two-layer disc because an optical pickup system for recording and reproducing signals conforming to the DVD standard comprises an objective lens having a relatively small numerical aperture of 0.6 which is designed for the cover layer of 600 μm thick, and even with such an objective lens having a small numerical aperture, a deviation of approximately 30 μm in depth of the first layer and the second layer each from the single recording layer does not significantly affect the reading of signals. In this event, though the deviation of 30 μm of the recording layers causes wave aberration in a reading light beam, the amount of wave aberration is too small to cause a problem when the numerical aperture is on the order of 0.6.

A long program such as a movie which overflows the first recording layer of the two-layer disc is reproduced from the two recording layers. The DVD standard also defines a single side signal-reproducing scheme, called an opposite track path scheme, for continuously reproducing from two layers. The opposite track path scheme involves reproducing from the recording layer at a depth of 570 μm from the inner periphery to the outer periphery, jumping the focus from the outer periphery of this recording layer to the recording layer at a depth of 630 μm, and reproducing signals on the deeper recording layer from the outer periphery to the inner periphery. In this event, by reading an information region representing the contents of the disc recorded on the layer at a depth of 570 μm, the apparatus can sense the title of the DVD, a program duration, or the two-layer disc in accordance with the opposite track path scheme.

Meanwhile, an increasing amount of information requires a higher density for next-generation optical disc. It is considered that the numerical aperture of the objective lens be increased to 0.8 or more for a higher density. When using an objective lens having such a large numerical aperture, the amount of wave aberration caused by an error in thickness of the cover layer on the recording layer increases too much to read signals, thereby failing to readily reproduce a next-generation optical disc when it is in a two recording layer structure. It is therefore considered that an optical system capable of adjusting the amount of wave aberration should be incorporated in a pickup to make a compensation for preventing the wave aberration in accordance with the depth of a recording layer.

When an optical system for compensating for the wave aberration is used to read a single-layer disc and a multi-layer disc such as a two-layer disc of the next-generation while maintaining the compatibility, the difference exists in thickness of a cover layer corresponding to depths between the respective recording layers, so that a light beam must be focused on each recording layer while correcting the same or the wave aberration to search for lead-in information and the like. This give rise to a problem that the time taken for starting reproduction becomes long if a two-layer disc is reproduced immediately after a single-layer disc was reproduced. In addition, with a large numerical aperture, a larger thickness of the cover layer causes an allowable range to be significantly narrowed down for the inclined disc, so that a multi-layer disc which has a larger thickness of cover layer than a single-layer disc must be fabricated with an improved planarity for the surface of the disc more than the single-layer disc.

OBJECT AND SUMMARY OF THE INVENTION

The present invention has been made in view of the situation as described above, and it is an object of the invention to provide a multi-layer-information-recording medium which permits rapid data reproduction even when information is recorded or reproduced using an objective lens having a large numerical aperture of 0.8 or more, and which can be fabricated with an equivalent planarity to a single-layer disc, and an information recording and reproducing apparatus suitable for use with the multi-layer-information-recording medium.

According to the present invention, there is provided a multi-layer-information-recording medium having a plurality of recording layers layered on a spacer layer on one side and applied to an information recording and reproducing apparatus capable of recording or reproducing information on a single-layer-information-recording medium having a single recording layer and a cover layer on one side as a change in reflectivity by irradiating a light beam through the cover layer onto the recording layer.

The multi-layer-information-recording medium of the present invention comprises:

a deepest recording layer disposed deepest from a light incident side surface at an optical distance d1 satisfying an equation d1=nt wherein "n" denotes a predetermined refractive index of the cover layer of the single-layer-information-recording medium compatible in terms of at least reproducing and recording with said multi-layer-information-recording medium and "t" denotes a thickness of said cover layer; and at least one shallow recording layer disposed at an optical distance d2 satisfying an inequality d2<nt from the light incident side surface.

According to one aspect of the present invention, said multi-layer-information-recording medium comprises only two layers consisting of said deepest recording layer and said shallow recording layer.

According to another aspect of the present invention of the multi-layer-information-recording medium, physical address information is recorded sequentially from said shallow recording layer to said deepest recording layer in a shallower order from the light incident side surface.

According to a further aspect of the present invention of the multi-layer-information-recording medium, physical address information is sequentially recorded in order from an inner periphery to an outer periphery of said deepest recording layer.

According to a still further aspect of the present invention of the multi-layer-information-recording medium, the physical address information is sequentially recorded alternately in a forward direction from the inner periphery to the outer periphery and in an opposite direction from the outer periphery to the inner periphery in each of the recording layers from said shallow recording layer to said deepest recording layer in the shallower order from the light incident side surface.

According to another aspect of the present invention of the multi-layer-information-recording medium, predetermined content information related to all contents on said shallow recording layer is recorded in said deepest recording layer.

According to the present invention, there is also provided an information recording and reproducing apparatus capable of recording or reproducing information on either of a single-layer-information-recording medium having a single recording layer and a multi-layer-information-recording medium having a plurality of recording layers layered on a spacer layer on one side by irradiating a light beam thereto.

The information recording and reproducing apparatus of the present invention comprises:

an optical pickup having an objective lens which irradiates a light beam to a multi-layer-information-recording medium which includes a deepest recording layer disposed deepest from a light incident side surface at an optical distance d1 satisfying an equation d1=nt wherein "n" denotes a predetermined refractive index of the cover layer of the single-layer-information-recording medium compatible in terms of at least reproducing and recording with said multi-layer-information-recording medium and "t" denotes a thickness of said cover layer, and at least one shallow recording layer disposed at an optical distance d2 satisfying an inequality d2<nt from the light incident side surface; and a focus servo circuit which controls the objective lens to, first of all, focus the light beam to said deepest recording layer at the optical distance d1, and executes an initial focus servo operation.

According to one aspect of the present invention of the information recording and reproducing apparatus, said focus servo circuit executes a focus servo operation for jumping a focused position to said shallow recording layer at the optical distance d2 after executing said initial focus servo operation.

According to another aspect of the present invention of the information recording and reproducing apparatus, said objective lens has a numerical aperture equal to or larger than 0.8 for producing a focused spot of the light beam According to a further aspect of the present invention of the information recording and reproducing apparatus, the apparatus further comprises an wave aberration correcting portion which varies the amount of wave aberration included in said focused spot.

According to a still further aspect of the present invention of the information recording and reproducing apparatus, said objective lens comprises a group of lenses which minimizes the amount of wave aberration in the light beam when the spot is focused at a position spaced by the optical distance d1.

DETAILED DESCRIPTION OF THE PREFERRED EMBODIMENTS

Next, embodiments of the present invention will be described with reference to the accompanying drawings.

TWO-LAYER DISC

Figure 1:
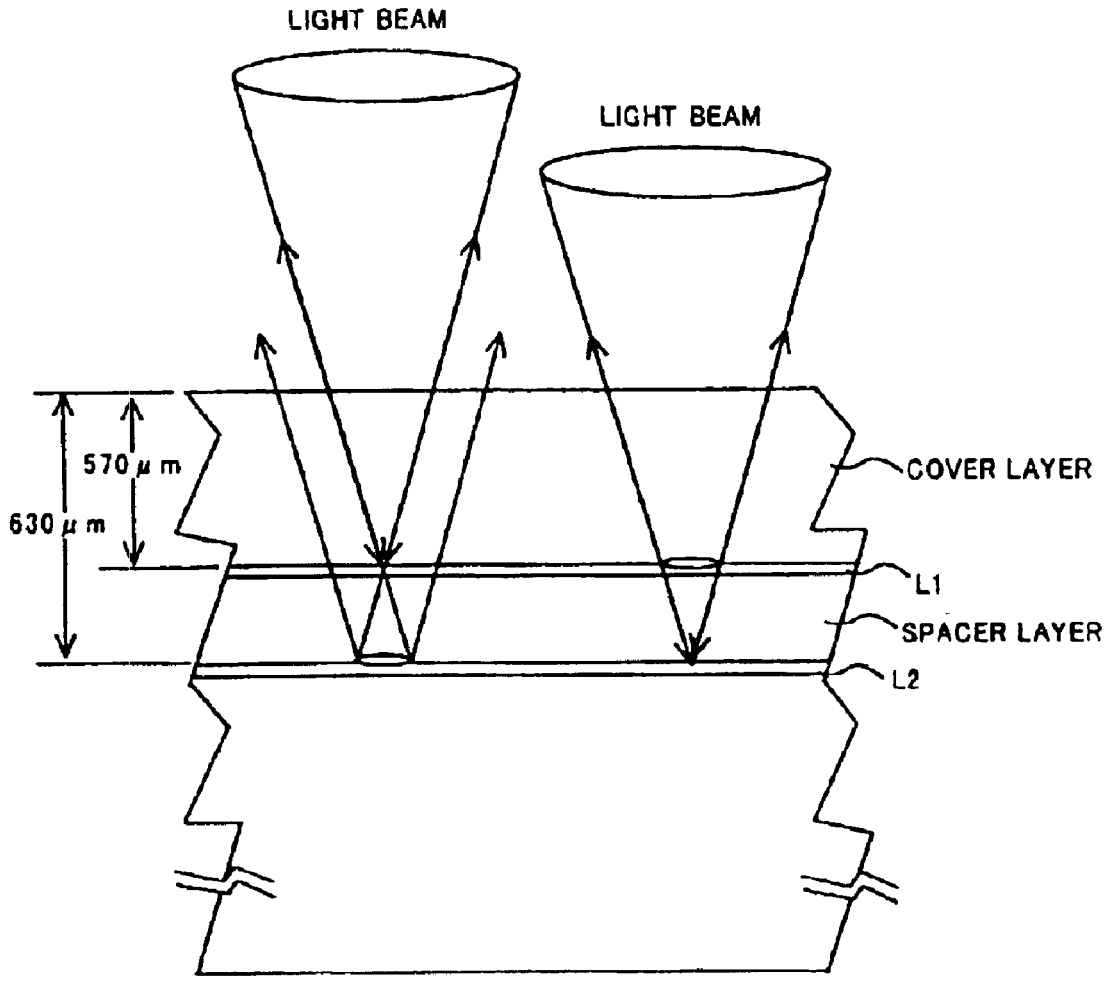
FIG. 1 is a cross-sectional view schematically showing a two-layer disc.
Figure 2:
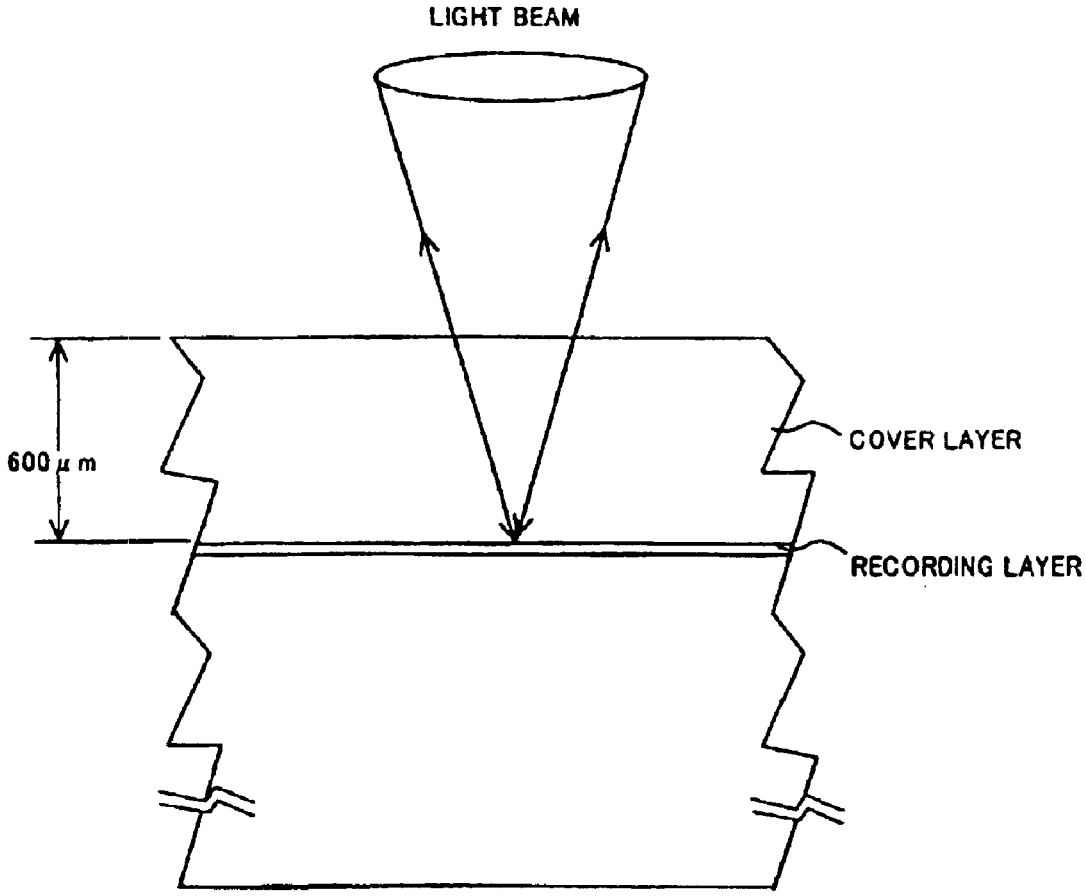
FIG. 2 is a cross-sectional view schematically showing a single-layer disc.
Figure 3:
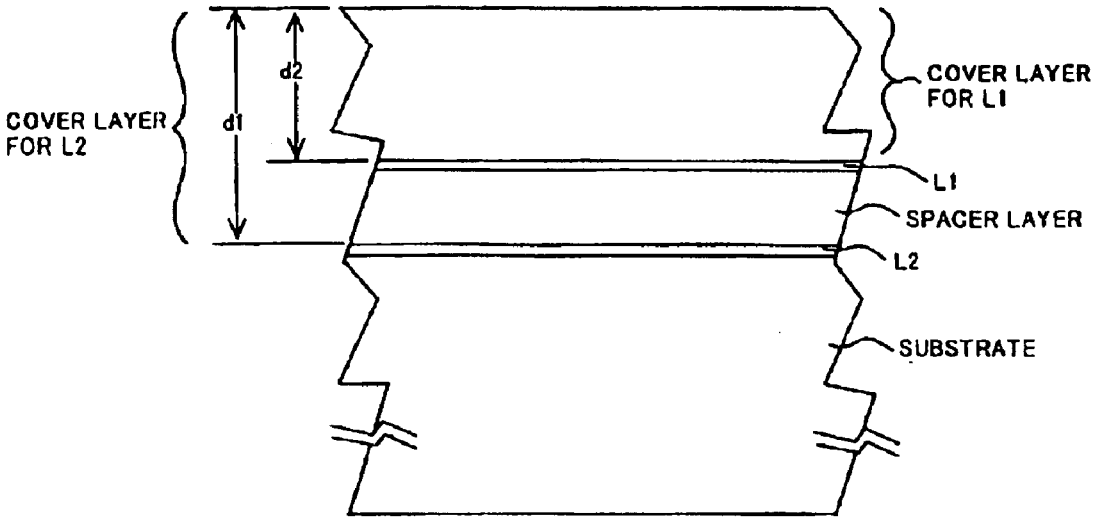
FIG. 3 is a cross-sectional view schematically showing a two-layer disc according to the present invention.
Figure 4:
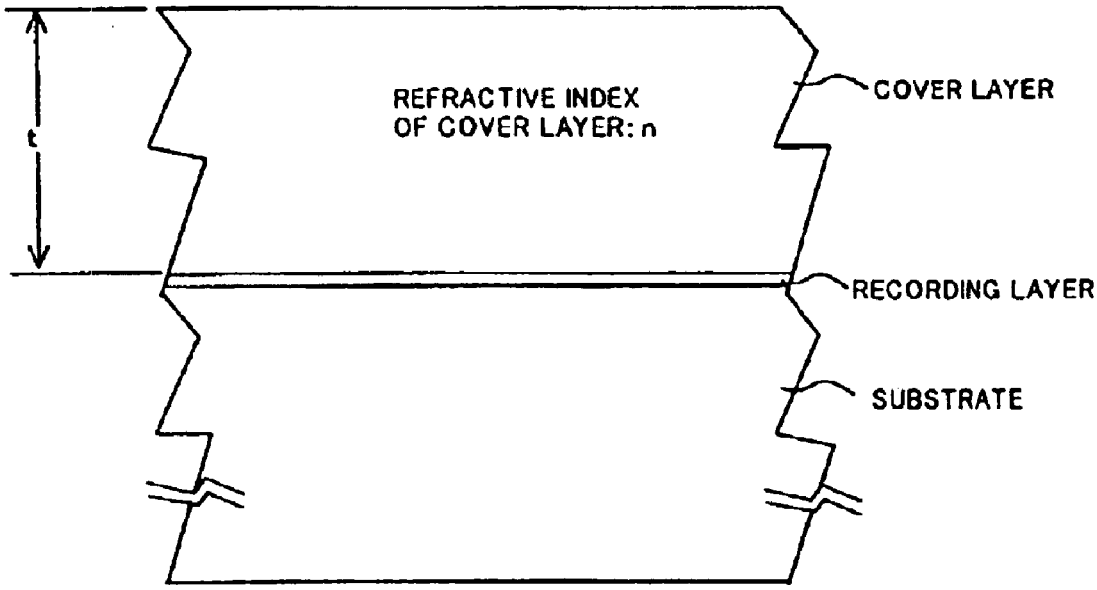
FIG. 4 is a cross-sectional view schematically showing a single-layer disc which is compatible with the two-layer disc of the present invention.

An exemplary multi-layer disc according to a first embodiment of the present invention is a two-layer disc having a two-layer structure comprised of recording layers L1, L2, for example, as shown in FIG. 3. This is a two-layer disc which is compatible in terms of reproduction or recording with a single-layer disc (FIG. 4) on which reproduction or recording is performed by a predetermined reproducing or recording means through a cover layer on a recording layer on a light incident side surface having a predetermined refractive index n and a thickness t.

The deepest recording layer, i.e., the recording layer positioned deepest from the light incident side surface of the recording layers of the two-layer disc is covered with a cover layer having a thickness which is related to an optical distance d1 as expressed by d1=nxt.

The shallow recording layer, other than the deepest recording layer, is covered with a cover layer having a thickness which is related to an optical distance d2 as expressed by d2<nxt. The two-layer disc comprises the deepest recording layer formed at the optical distance d1 which satisfies the equation d1=nxt, and the shallow recording layer formed at the optical distance d2 which satisfies the inequality d2<nxt.

In this two-layer disc, since the deepest recording layer is set at the optical distance d1 at the same position of the optical path thickness as the recording layer of the single-layer disc, information on the deepest recording layer at the optical distance d1 can be reproduced without searching for the position of the shallower recording layer of the multi-layer disc even by a pickup which is adapted to minimize the wave aberration for the single-layer disc. Also, since the optical distance d2 is set shorter than d1, an allowance for an inclined disc, when recording or reproducing is performed on the shallow recording layer, is not more strict than for the single-layer disc, so that the planarity need not be improved as compared with the single-layer disc.

With the two-layer disc, information may be recorded on the assumption that it is reproduced from the two layers in a predetermined order in which the shallow recording layer at the optical distance d2 is reproduced ahead of the deepest recording layer. Specifically, physical address information can be recorded sequentially from the shallow recording layer to the deepest recording layer, in an order of shallower layers from the light incident side surface.

Further, with the two-layer disc, signals are reproduced from the inner periphery to the outer periphery of the surface at the optical distance d2. Alternatively, signals may be reproduced from the outer periphery to the inner periphery of the surface at the optical distance d1. Also, the physical address information can be recorded in order from the inner periphery to the outer periphery of the deepest recording layer.

By thus designing the two-layer disc, for reproducing a program which exceeds a recording limit amount of the shallow recording layer, remaining information recorded on the deepest recording layer is reproduced after completion of reproduction from the shallow recording layer having a larger allowance of an inclined disc, so that it is possible to increase the allowance for a normally inclined disc.

In the two-layer disc, predetermined content information related to all contents on the two layers can be recorded on the deepest recording layer at the optical distance d1. In this event, a signal reproducing apparatus reads the title of the two-layer disc, a program recording time, or predetermined information indicating that this two-layer disc conforms to the opposite track path scheme or the like from the deepest recording layer at the optical distance d1, and then jumps a focused position to the inner periphery of the shallow recording layer at the optical distance d2 and can continue to reproduce signals. Physical address information may be sequentially recorded alternately in a forward direction from the inner periphery to the outer periphery and in the opposite direction from the outer periphery to the inner periphery in each recording layer in the order of depth from the deepest recording layer to the shallow recording layer.

With the disc on which information is recorded in the foregoing manner, predetermined information indicative of the content of the disc over two layers can be read in the same wave aberration correcting state as a single-layer disc, so that the reproducing apparatus can be aware of a two-layer disc on which information is recorded without searching for the position of the recording layers by its wave aberration correcting unit, and can immediately start the reproduction. Thus, according to the present invention, when the adjacent recording layers are reproduced from the shallow recording layer, the optical pickup can be smoothly moved between reproducing planes of the recording layers.

This information may be such one that is recorded in an inner peripheral portion of the deepest recording layer as a pit, or a bar code, or what is called a PEF which forms a bar code like one using pits, or a wave aberration correcting signal for a region in which a signal is recorded for use in detection of wave aberration in order to correct the wave aberration.

When the numerical aperture of an objective lens for converging a light spot is chosen to be 0.8 or more, the objective lens is designed to minimize the amount of wave aberration when it focuses through the optical distance d1.

While the foregoing example has been described for the two-layer disc, a disc having three or more layers can be designed in a similar manner, and other recording layers may also be provided even if they do not satisfy the foregoing condition. Also, while the recording density has not been described, the two recording layers may have the same recording density, or may differ from each other in recording density.

While in the foregoing example, the thickness of the cover layers has been described to be equal in the length of optical path. This can be of course realized by materials equal in the refractive index to each other and identical in thickness. Otherwise, even with materials having different refractive indexes, they may be sized to be equal in the product of the refractive index and thickness, i.e., the optical thickness (distance). Also, when a material (spacer) filled between layers has a different refractive index, it can be set to have an equivalent optical path length by sequential calculations.

For example, assuming that the cover layer on the light incident side surface of the two-layer disc has a refractive index $n_c$ and a thickness $t_c$, the shallow recording layer L1 has a refractive index $n_{L1}$ and a thickness $t_{L1}$, and a spacer layer between the recording layers L1, L2 has a refractive index $n_s$ and a thickness $t_s$ the disc is designed such that the optical distance d1 from the surface on the light incident side of the deepest recording layer L2 satisfies $d1=nxt=n_c x1_a=n_{L1}xt_{L1}=n_s xt_s$, and the optical distance d2 from the surface on the light incident side of the shallow recording layer L1 satisfies $d2=n_c xt_c<nxt$.

Each of the recording layers L1, L2 has a laminate structure comprised of a recording layer made of a phase changing material such as Ag—In—Sb—Te, and glass protection layers made of, for example, ZnS—$SiO_2$ or the like which sandwich the recording layer. For an optical disc which uses a recording layer made of a phase changing material and on which data can be recorded or erased, i.e., rewritten using an optical beam, each recording layer can be provided with a rewritable region in which data can be rewritten, i.e., recorded or erased, and a prepit region which is provided with trains of emboss pits that carry addresses as sequential physical addresses and information such as recording timing. While an example of rewritable two-layer disc using a phase changing material is described, the material for the recording layer is not limited to the phase changing material in the present invention, but a write-once pigment material may be used. Moreover, the two layer disc may be implemented as a disc dedicated to reproduction.

The single-layer and multi-layer discs compatible for reproducing and recording are common in the disc diameter, overall disc thickness, track pitch, minimum pitch length, bowing angle, birefringence, format, and the like, other than the aforementioned conditions. For example, these may conform to a CAV (constant angular velocity) or a CLV (constant linear velocity) scheme. Alternatively, they may be multi-layer disc in accordance with a zone CAV or a CLV scheme which is a combination of CAV and CLV. In addition, each recording layer of the multi-layer disc is previously formed with convex groove tracks and concave groove tracks alternately in a spiral or concentric shape. Each of the groove tracks may be wobbled at a frequency corresponding to the rotational speed of the multi-layer disc.

RECORDING/REPRODUCING APPARATUS

Data is recorded on the multi-layer disc by irradiating a prepit region and a rewritable region of a recording layer thereof with a reproducing light beam having a low intensity (reading power) for scanning to detect land prepits and groove prepits in the prepit region, recognizing the position on a track to be recorded, and irradiating the rewritable region of the track with a focused recording light beam (writing power) having a high intensity modulated in accordance with the data.

Figure 5:
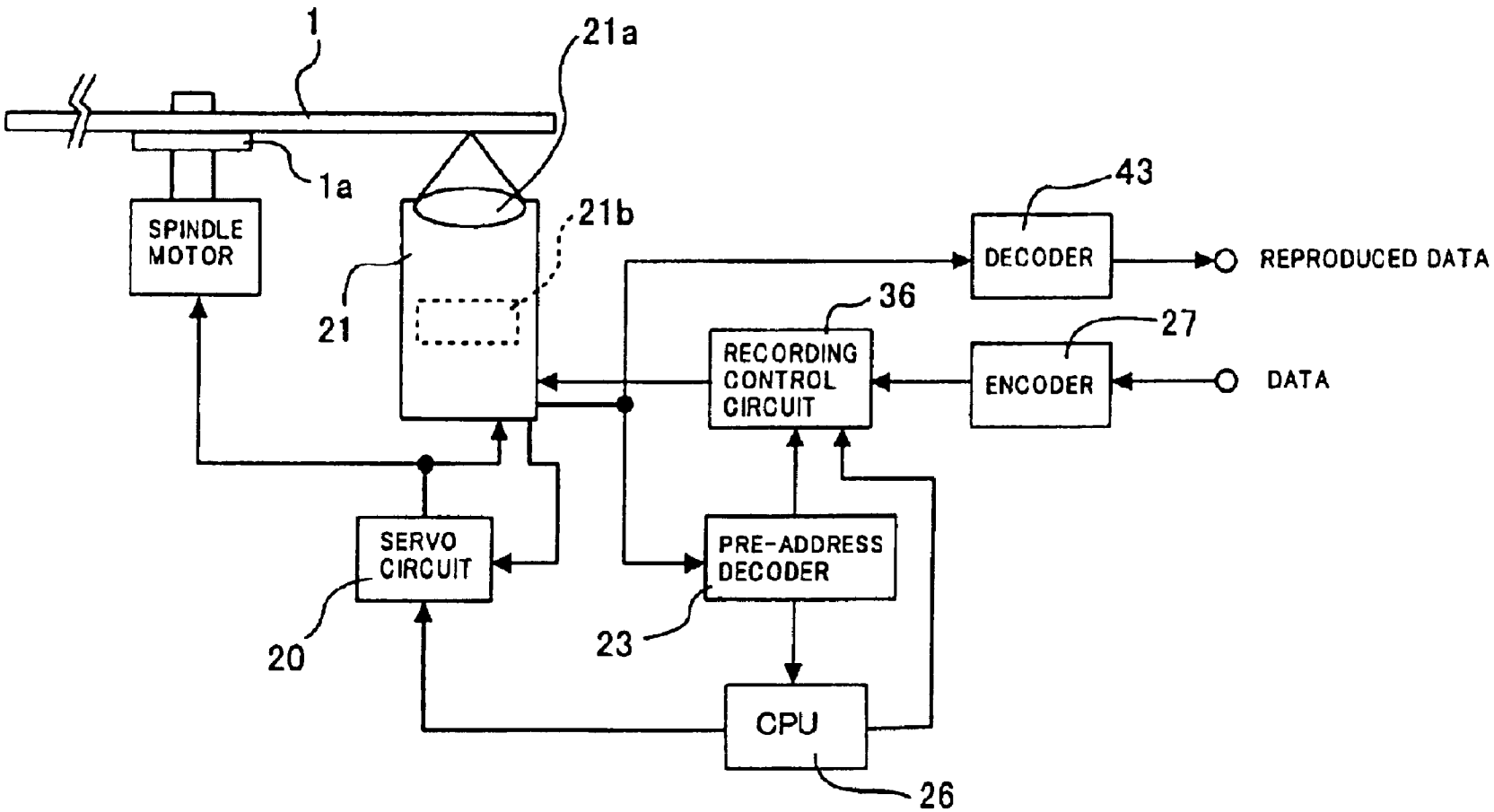
FIG. 5 is a block diagram for schematically describing the configuration of a recording and reproducing apparatus according to the present invention.

FIG. 5 is a block diagram illustrating the configuration of a recording and reproducing apparatus according to the present invention.

An optical pickup 21 comprises an optical system which includes a focusing lens, a beam splitter, and objective lens, and the like; a semiconductor laser which is a light source; a photodetector; and objective lens actuator; and the like. The objective lens 21a has a numerical aperture equal to or larger than 0.8 and produces a focused spot of a light beam on a recording layer. The objective lens 21a is comprised of a group of lenses which minimize the amount of wave aberration of the light beam when either of a compatible single-layer or multi-layer disc is loaded at a normal position, and when the spot is focused at the optical distance d1 from the surface. The optical pickup 21 comprises a wave aberration correcting means 21b for varying the amount of wave aberration included in the focused spot.

When loading a multi-layer disc 1 onto a turntable 1a driven by a splindle motor, the optical pickup 21 irradiates the multi-layer disc 1 with a light beam as recording light or a reading light. The optical pickup 21 comprises the photodetector which detects a reflected light beam from a recording layer of the multi-layer disc to read a signal corresponding to a track and prepits or recording marks formed on the multi-layer disc 1 as a change in reflectivity. A servo circuit 20 has a focus servo circuit and a tracking servo circuit for performing a servo control for focusing and tracking of the pickup, a control for a reproduced position (radial position), a control for the rotational speed of the spindle motor, and the like based on a control signal provided from the optical pickup 21 and a control command provided from a control unit (CPU) 26. When the multi-layer disc in the aforementioned example, for example, a two-layer disc is loaded, the optical beam is first irradiated to the deepest recording layer L2 at the optical distance d1, executes an initial focus servo operation, and performs a tracking servo and a focus servo control for the objective lens such that the light beam is focused correctly on the recording layer of the multi-layer disc. The focus servo circuit also executes a focus servo operation for jumping a focused position to the shallow recording layer L1 at the optical distance d2 after executing the initial focus servo operation.

A read signal (RF signal) output from the optical pickup 21 is amplified in an amplifier circuit, and supplied to a pre-address decoder 23 and a decoder 43.

The pre-address decoder 23 extracts prepits, wobble signals, and the like, and a synchronous clock and timing signal generator circuit within the pre-address decoder 23 generates a clock signal and a timing signal in synchronism with the rotation of the multi-layer disc 1. The timing signal represents a current position on the disc such as a prepit region or a writable region recorded (reproduced) by the light beam, or a land track or a groove track or the like. The pre-address decoder 23 reads address information from a signal read from emboss pits in the prepit region of the disc by the pickup, and sends the address information and timing signal to the CPU 26. The pre-address decoder 23 includes a circuit for detecting the rewritable region and prepit region on the multi-layer disc.

The CPU 26 detects the position of the prepit region on the recording layer from these signals. A storage device is contained in or connected to the CPU 26 for storing necessary data and the like. The CPU 26 generally controls the apparatus based on signals supplied thereto. The CPU 26 reads the address information from the pre-address decoder 23, and sends a control command to a recording control circuit 36 and servo circuit 20 to control a recording and reproducing operation at a predetermined address.

The recording control circuit 36 controls the power of the laser in the pickup in accordance with a particular state such as recording, erasing, reproducing and the like based on a control command from the CPU 26 and a timing signal from the pre-address decoder 23. In a recording state, the recording control circuit 36 modulates the power of the laser in the pickup based on a signal from an encoder 27 to record information on the disc. In a reproducing state (when data in the rewritable region is reproduced, or when address information in the prepit region is reproduced), the recording control circuit 36 controls the reading power to maintain at constant low power so as not to erase information recorded on the disc.

The encoder 27 adds a parity code for error correction to data to be recorded, and converts the resulting data to an RLL (Run Length Limited) code for encoding to a signal suitable for recording on the multi-layer disc 1. The encoded signal is sent from the encoder 27 to the recording control circuit 36.

The decoder 43 performs the processing reverse to that performed in the encoder (demodulation of an RLL code, error correction, and the like) on a signal read from the rewritable region of the disc to recover originally recorded data.

As described above, the present invention provides a multi-layer-information-recording medium which has two or more recording layer compatible with a single-layer disc, and a cover layer having the same optical path length as a cover layer of the single-layer disc, with another recording layer disposed at the position of a cover layer thinner than that, so that the multi-layer-information-recording medium excels in stability for planarity of the disc, and information can be recorded and reproduced in such an order that signals can be continuously reproduced from these recording layers.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2001-156477 which is hereby incorporated by reference.

What is claimed is:

[1. A multi-layer-information-recording medium having a plurality of recording layers layered on a spacer layer on one side and adapted to an information recording and reproducing apparatus capable of recording or reproducing information on a single-layer-information-recording medium having a single recording layer and a cover layer on one side as a change in reflectivity by irradiating a light beam through the cover layer onto the recording layer, said multi-layer-information-recording medium comprising:

a deepest recording layer disposed deepest from a light incident side surface at an optical distance d1 satisfying an equation d1=nt wherein "n" denotes a predetermined refractive index of the cover layer of the single layer-information-recording medium compatible in terms of at least reproducing and recording with said multi-layer-information-recording medium and "t" denotes a thickness of said cover layer; and at least one shallow recording layer disposed at an optical distance d2 satisfying an inequality d2<nt from the light incident side surface.]

[2. A multi-layer-information-recording medium according to claim 1, wherein said multi-layer-information-recording medium consists of said deepest recording layer and said shallow recording layer as only two layers.]

[3. A multi-layer-information-recording medium according to claim 1, wherein said multi-layer-information-recording medium includes physical address information recorded sequentially from said shallow recording layer to said deepest recording layer in a shallower order from the light incident side surface.]

[4. A multi-layer-information-recording medium according to claim 1, wherein said multi-layer-information-recording medium includes physical address information sequentially recorded in order from an inner periphery to an outer periphery of said deepest recording layer.]

[5. A multi-layer-information-recording medium according to claim 4, wherein said multi-layer-information-recording medium includes the physical address information sequentially recorded alternately in a forward direction from the inner periphery to the outer periphery and in an opposite direction from the outer periphery to the inner periphery in each of the recording layers from said shallow recording layer to said deepest recording layer in the shallower order from the light incident side surface.]

[6. A multi-layer-information-recording medium according to claim 1, wherein said multi-layer-information-recording medium includes predetermined content information related to all contents on said shallow recording layer recorded in said deepest recording layer.]

[7. An information recording and reproducing apparatus capable of recording or reproducing information on either of a single-layer-information-recording medium having a single recording layer and a multi-layer-information-recording medium having a plurality of recording layers layered on a spacer layer on one side by irradiating a light beam thereto, said information recording and reproducing apparatus comprising:

an optical pickup having an objective lens which irradiates a light beam to a multi-layer-information-recording medium which includes a deepest recording layer disposed deepest from a light incident side surface at an optical distance d1 satisfying an equation d1=nt wherein "n" denotes a predetermined refractive index of the cover layer of the single-layer-information-recording medium compatible in terms of at least reproducing and recording with said multi-layer-information-recording medium and "t" denotes a thickness of said cover layer, and at least one shallow recording layer disposed at an optical distance d2 satisfying an inequality d2<nt from the light incident side surface; and a focus servo circuit which controls the objective lens to first of all focus the light beam to said deepest recording layer at the optical distance d1, and executes an initial focus servo operation.]

[8. An information recording and reproducing apparatus according to claim 7, wherein said focus servo circuit executes a focus servo operation for jumping a focused position to said shallow recording layer at the optical distance d2 after executing said initial focus servo operation.]

[9. An information recording and reproducing apparatus according to claim 7, wherein said objective lens has a numerical aperture equal to or larger than 0.8 for producing a focused spot of the light beam.]

[10. An information recording and reproducing apparatus according to claim 9, further comprising an wave aberration correcting portion which varies the amount of wave aberration included in said focused spot.]

[11. An information recording and reproducing apparatus according to claim 9, wherein said objective lens comprises a group of lenses which minimizes the amount of wave aberration in the light beam when the spot is focused at a position spaced by the optical distance d1.]

*12. A multi-layer-information-recording medium that is compatible with a single-layer-information-recording medium in terms of reproducing or recording, the single-layer-information-recording medium having a cover layer having a refractive index "n" and a thickness "t" on the light incident side,*

*said multi-layer-information-recording medium comprising a first recording layer and a second recording layer that are layered in order from the light incident side surface of the multi-layer-information-recording medium,*

*wherein the second recording layer is disposed at an optical distance "d1" from the light incident side surface satisfying an equation d1=n x t;*

*wherein the first recording layer is disposed at an optical distance "d2" from the light incident side surface satisfying an inequality d2<n x t; and*

*wherein a physical address information is recorded from said second recording layer to said first recording layer in order.*

*13. A multi-layer-information-recording medium according to claim 12, wherein the physical address information is recorded in order to form an inner periphery to an outer periphery of said second recording layer.*

*14. A multi-layer-information-recording medium according to claim 13, wherein the physical address information is recorded in order from an outer periphery to an inner periphery of said first recording layer.*

*15. A multi-layer-information-recording medium according to claim 12, wherein a compatibility of the multi-layer-information-recording medium and the single-layer-information-recording medium is common in disc diameter, overall disc thickness, and track pitch.*

*16. A multi-layer-information-recording medium according to claim 15, wherein a compatibility of the multi-layer-information-recording medium and the single-layer-information-recording medium is common in minimum pitch length, bowing angle, birefringence, and format.*

*17. A multi-layer-information-recording medium that is compatible with a single-layer-information-recording medium in terms of reproducing or recording, the single-layer-information-recording medium having a cover layer having a refractive index "n" and a thickness "t" on the light incident side,*

*said multi-layer-information-recording medium comprising a cover layer, a first recording layer, a spacer layer, and a second recording layer that are layered in order from the light incident side surface of the multi-layer-information-recording medium,*

*wherein on condition that the cover layer has a refractive index "nC" and a thickness "tC" and the first recording layer has a refractive index "nL1" and a thickness "tL1" and the spacer layer has a refractive index "nS" and a thickness "tS", the second recording layer is disposed at an optical distance "d1" from the light incident side surface satisfying an equation* $d1=n \times t = nC \times tC + nL1 \times tL1 + nS \times tS$;

*wherein the first recording layer is disposed at an optical distance "d2" from the light incident side surface satisfying an equation* $d2=nC \times tC < n \times t$; *and*

*wherein a physical address information is recorded from said second recording layer to said first recording layer in order.*

*18. A multi-layer-information-recording medium according to claim 17, wherein the physical address information is recorded in order from an inner periphery to an outer periphery of said second recording layer.*

*19. A multi-layer-information-recording medium according to claim 18, wherein the physical address information is recorded in order from an outer periphery to an inner periphery of said first recording layer.*

*20. A multi-layer-information-recording medium according to claim 17, wherein a compatibility of the multi-layer-information-recording medium and the single-layer-information-recording medium is common in disc diameter, overall disc thickness, and track pitch.*

*21. A multi-layer-information-recording medium according to claim 20, wherein a compatibility of the multi-layer-information-recording medium and the single-layer-information-recording medium is common in minimum pitch length, bowing angle, birefringence, and format.*

*22. A multi-layer-information-recording medium that is compatible with a single-layer-information-recording medium in terms of reproducing or recording, the single-layer-information-recording medium having a cover layer having a refractive index "n" and a thickness "t" on the light incident side,*

*said multi-layer-information-recording medium comprising a deepest recording layer and one or more shallow recording layers shallower than the deepest recording layer that are layered in order from the light incident side surface of the multi-layer-information-recording medium,*

*wherein the deepest recording layer is disposed at an optical distance "d1" from the light incident side surface satisfying an equation* $d1=n \times t$;

*wherein the shallow recording layer is disposed at an optical distance "d2" from the light incident side surface satisfying an inequality* $d2<n \times t$; *and*

*wherein a physical address information is recorded from said deepest recording layer to said shallow recording layer in order.*

*23. A multi-layer-information-recording medium according to claim 22, wherein said multi-layer-information-recording medium consists of said deepest recording layer and said shallow recording layer as only two layers.*

*24. A multi-layer-information-recording medium according to claim 22, wherein the physical address information is recorded in order from an inner periphery to an outer periphery of said deepest recording layer.*

*25. A multi-layer-information-recording medium according to claim 24, wherein the physical address information is recorded in order from an outer periphery to an inner periphery of said shallow recording layer.*

*26. A multi-layer-information-recording medium according to claim 22, wherein a compatibility of the multi-layer-information-recording medium and the single-layer-information-recording medium is common in disc diameter, overall disc thickness, and track pitch.*

*27. A multi-layer-information-recording medium according to claim 26, wherein a compatibility of the multi-layer-information-recording medium and the single-layer-information-recording medium is common in minimum pitch length, bowing angle, birefringence, and format.*

*28. An information reproducing apparatus for reproducing information from a multi-layer-information-recording medium according to claim 12.*

*29. An information reproducing apparatus for reproducing information from a multi-layer-information-recording medium according to claim 13.*

*30. An information reproducing apparatus for reproducing information from a multi-layer-information-recording medium according to claim 14.*

*31. An information reproducing apparatus for reproducing information from a multi-layer-information-recording medium according to claim 15.*

*32. An information reproducing apparatus for reproducing information from a multi-layer-information-recording medium according to claim 16.*

*33. An information reproducing apparatus for reproducing information from a multi-layer-information-recording medium according to claim 17.*

*34. An information reproducing apparatus for reproducing information from a multi-layer-information-recording medium according to claim 18.*

*35. An information reproducing apparatus for reproducing information from a multi-layer-information-recording medium according to claim 19.*

*36. An information reproducing apparatus for reproducing information from a multi-layer-information-recording medium according to claim 20.*

*37. An information reproducing apparatus for reproducing information from a multi-layer-information-recording medium according to claim 21.*

*38. An information reproducing apparatus for reproducing information from a multi-layer-information-recording medium according to claim 22.*

*39. An information reproducing apparatus for reproducing information from a multi-layer-information-recording medium according to claim 23.*

*40. An information reproducing apparatus for reproducing information from a multi-layer-information-recording medium according to claim 24.*

*41. An information reproducing apparatus for reproducing information from a multi-layer-information-recording medium according to claim 25.*

*42. An information reproducing apparatus for reproducing information from a multi-layer-information-recording medium according to claim 26.*

*43. An information reproducing apparatus for reproducing information from a multi-layer-information-recording medium according to claim 27.*

*44. An information reproducing apparatus for reproducing information from a multi-layer-information-recording medium according to claim 28.*

* * * * *